United States Patent [19]

Matthews et al.

[11] Patent Number: 5,380,341
[45] Date of Patent: Jan. 10, 1995

[54] SOLID STATE ELECTROCHEMICAL CAPACITORS AND THEIR PREPARATION

[75] Inventors: M. Dean Matthews, Saratoga; Pedro G. Medrano, Mountain View, both of Calif.

[73] Assignee: Ventritex, Inc., Sunnyvale, Calif.

[21] Appl. No.: 127,666

[22] Filed: Sep. 27, 1993

[51] Int. Cl.⁶ .......................................... H04R 17/00
[52] U.S. Cl. .................................. 29/25.03; 427/79; 361/523; 361/526; 361/541
[58] Field of Search ..................... 29/25.03; 427/79; 361/523, 525, 526, 527, 541, 522

[56] References Cited

U.S. PATENT DOCUMENTS

| | | | |
|---|---|---|---|
| 3,419,760 | 12/1968 | Raleigh | 317/230 |
| 3,562,008 | 2/1971 | Martinsons | 117/224 |
| 3,632,498 | 1/1972 | Beer | 204/290 |
| 3,718,551 | 2/1973 | Martinsons | 204/98 |
| 3,776,834 | 12/1973 | O'Leary | 204/290 |
| 4,024,036 | 5/1977 | Nakamura et al. | 204/129 |
| 4,052,271 | 10/1977 | Beer | 204/38 |
| 4,414,607 | 11/1983 | Sekido et al. | 361/433 |
| 4,480,290 | 10/1984 | Constanti et al. | 29/25.03 |
| 4,925,538 | 5/1990 | Matsumoto et al. | 204/129 |
| 5,047,899 | 9/1991 | Bruder | 361/502 |
| 5,055,169 | 10/1991 | Hock, Jr. et al. | 204/192 |
| 5,062,025 | 10/1991 | Verhoeven et al. | 361/509 |
| 5,136,478 | 8/1992 | Bruder et al. | 361/502 |
| 5,153,820 | 10/1992 | MacFarlane et al. | 29/25.03 |
| 5,189,770 | 3/1993 | Waidhas et al. | 361/523 |
| 5,230,712 | 7/1993 | Matthews | 361/523 |
| 5,254,360 | 10/1993 | Crownover et al. | 427/79 |

FOREIGN PATENT DOCUMENTS

1196683 12/1985 Canada .................... 319/73

OTHER PUBLICATIONS

"Advanced Double Layer Capacitors", Sarangapani, et al., Journal of Power Sources 29 (1990) pp. 355–364.
"Electrochromic Effects in solid Phosphotungstic Acid and phosphomolybdic Acid", tell, et al., J. Appl. Phys. 50(9), Sep. 1979.
"Transition from 'Supercapacitor' to 'Battery' Behavior in electrochemical energy Storage" Conway, J. Electrochem. Soc., vol. 138, No. 6, Jun. 1991.
"The Preparation of Monodisperse Colloidal Metal Particles from Microemulsions", Boutonnet, et al. Colloids and Surfaces, 5 (1982) pp. 209–225.
"Implantable Cardioverts and Defibrillators", Troup, Current Problems in Cardiology vol. XIV, No. 12, Dec. 1989.
"Operating Principles of the Ultracapacitor", Bullard, et al., IEEE Transactions on Magnetics, vol. 25, No. 1, Jan. 1989.
"High–Conductivity Solid Proton Conductors: Dodecamo Lybdophosphoric Acid and Dodecatungstophosphoric Acid Crystals", Nakamura, et al., Chemistry Letters, pp. 17–18, 1979.

*Primary Examiner*—Tom Thomas
*Assistant Examiner*—Kevin M. Picaroat
*Attorney, Agent, or Firm*—Mark J. Meltzer; Steven M. Mitchell

[57] ABSTRACT

An electrochemical capacitor is prepared by assembling a stacked assembly of at least two bipolar electrodes, where each of the bipolar electrodes includes a metal foil electrode substrate having a porous, electronically conductive substrate coating, preferably porous platinum, on each surface. The stacked assembly further has a porous separator layer between each of the electrodes, made of a material that is electronically non-conductive. An ionic conductor electrolyte, preferably a polyoxometalate, that wets both the substrate coating and the separator layer at temperatures above the melting point of the solid ionic conductor electrolyte is provided, the ionic conductor electrolyte having a melting point above about 30° C. The ionic conductor electrolyte is introduced into the stacked assembly, as by external infiltration with an optional applied pressure to assist the infiltration.

15 Claims, 7 Drawing Sheets

SOLID STATE ELECTROCHEMICAL CAPACITORS AND THEIR PREPARATION

TECHNICAL FIELD

The present invention relates generally to the production of devices used for the storage of electrical energy, and more specifically to a process for producing multi-cell solid state electrochemical capacitors and the capacitors produced using such method.

BACKGROUND OF THE INVENTION

Devices for the storage of electrical energy can be described as batteries or capacitors based upon the mechanisms used for energy storage and the discharge characteristics they exhibit. For example, see B. E. Conway, *J. Electrochem. Soc.*, v. 138, no. 6, pp. 1539–48, 1991. In rechargeable batteries, energy is stored almost entirely through reversible oxidation-reduction (redox) reactions. Although a double layer exists at the electrode surfaces, it contributes very little to the stored energy. In capacitors, a significant amount of energy is stored in the double layer at the electrode surfaces, although in some cases, as described by Conway above, a major fraction of stored energy is attributable to reversible surface redox reactions. As compared to batteries, electrochemical capacitors can be characterized as having low energy density, high power density and a high cycle life as described in S. Sarangapani et al., *Journal of Power Sources*, v. 29, pp. 355–64, 1990. Further, in an electric circuit, an electrochemical capacitor behaves more like a classical dielectric capacitor than a battery, hence its name.

The fundamental unit or cell of an electrochemical capacitor consists of two electrodes and an electrolyte. Both double layer and redox reactions may occur at one or both electrode surfaces. The energy storage of the device is limited by the decomposition voltage of the electrolyte and the available electrode surface area. The decomposition voltage is the voltage at which non-reversible redox reactions occur between the electrode surface and the electrolyte. For example, capacitors utilizing an aqueous electrolyte are limited to the potential per cell at which water electrolyzes (about 1.2 volts). A capacitor employing a solid electrolyte such as $RbAg_4I_5$ is limited to a cell voltage of less than 0.7 volts.

There is a continuing search for improved capacitor designs to deliver high discharge currents in short pulses upon demand for particular applications. New types of capacitors based upon advanced electrochemical systems, sometimes termed supercapacitors, offer the promise of increased capacitance and specific capacitance as compared to conventional capacitors. However, the existing techniques for the production of such capacitors are not well suited for mass production applications.

The conventional method for making solid electrolyte capacitors is based upon the use of powdered materials for the electrolyte that are pressed or held together with a binder. U.S. Pat. Nos. 3,419,760 and 5,047,899 exemplify the pressed powder method for solid electrolyte capacitors.

One way to increase the voltage of electrochemical cells is to stack a number of cells together in series, similar to a multi-cell battery. However, multi-cell electrochemical capacitors have been limited in voltage due to the difficulty of manufacturing devices containing a large number of cells with sufficiently low equivalent series resistance. These devices have also been limited in application due to their relatively high cost of production. In the case of solid electrolyte devices, multi-cell stacks are seldom used due to the difficulty of working with powders. Also, the minimum electrode thickness that can be achieved limits the number of cells that can be assembled in a practical device.

As stated above, the energy density of electrochemical capacitors is inferior to that of batteries. This is in part due to the volume of the electrode and electrolyte that does not participate in the storage of energy. Since energy storage occurs at the interfacial surface, the interior volume of the electrode and electrolyte layers is essentially wasted. In addition, the interior volume of the electrode and electrolyte layers contributes to the equivalent series resistance of the device, with the bulk being due to the electrolyte. Prior art methods which utilize powders have not been effective in minimizing the interior volume of the electrolyte between the two electrodes. Thus, high conductivity electrolytes such as sulfuric acid are used in spite of the difficulties associated with the containment of a corrosive liquid. The use of solid electrolytes offers the advantage of a more stable and more reliable device at the expense of greater electrolyte resistivity and a typically lower decomposition voltage than aqueous electrolytes such as sulfuric acid. However, the prior art has not effectively reduced the electrolyte thickness. Decreasing the thickness of the solid electrolyte layer would decrease the resistance of the layer and compensate for the higher resistivity of the solid electrolyte. A decreased electrolyte thickness would also permit more cells to be stacked in a device of a given height, thereby compensating for the relatively low decomposition voltage of the solid electrolyte.

Accordingly, it is an object of the invention to provide an improved method of manufacturing electrochemical capacitors having a thinner solid electrolyte layer. It is a further object of the invention to provide a method of producing multiple cell electrochemical capacitors with a high energy density, high working voltage and a low equivalent series resistance.

SUMMARY OF THE INVENTION

These and other objects are achieved in the present invention by maximizing the available interfacial surface area for energy storage, minimizing the internal volume of the electrode and electrolyte materials and using an infiltrated solid electrolyte in conjunction with a method for assembly that eliminates the need for close tolerance alignment of electrodes.

In accordance with the present invention, a method for making an electrochemical capacitor comprises the steps of assembling a stacked assembly of at least two bipolar electrodes, wherein each of the bipolar electrodes comprises a metal foil electrode substrate having a porous, electronically conductive, non-oxide substrate coating on each surface. The stacked assembly further includes a porous separator layer between each of the electrodes, the separator layer being made of a material that is electronically non conductive. An ionic conductor electrolyte that wets both the substrate coating and the separator layer at temperatures above the melting point of the solid ionic conductor electrolyte is provided. The ionic conductor electrolyte has a melting point above about 30° C. The ionic conductor electrolyte is introduced into the stacked assembly.

In one embodiment, the porous substrate coating is a porous metal. The porous metal can be applied to the substrate by any appropriate technique such that the deposit is porous, preferably aerosol spray coating from a colloidal suspension. Platinum is the preferred porous metal, but other platinum-group metals and non-oxides oxides that can be provided in a porous deposited form can also be used.

The ionic conductor electrolyte is preferably a polyoxometalate ionic conductor such as molybdophosphoric acid and salts thereof, and tungstophosphoric acid and salts thereof. The separator layer is preferably in a form such as a freestanding mesh, a freestanding felt, or a porous coating applied to an electrode. In one approach, a method for making an electrochemical capacitor includes a step of providing a stacked assembly of at least two bipolar electrodes. Each of the bipolar electrodes comprises a metal foil electrode substrate having a porous, electronically conductive substrate coating on each surface selected from the platinum-group metals. The stacked assembly further includes a porous separator layer between each of the electrodes, the separator layer being made of a material that is electronically nonconductive. The electrodes are supported in a fixture. An ionic conductor electrolyte is provided that wets both the substrate coating and the separator layer at temperatures above the melting point of the solid ionic conductor electrolyte, the ionic conductor electrolyte having a melting point above about 30° C. The solid ionic conductor electrolyte is melted and contacted to an edge of the stacked assembly to permit the molten ionic conductor to be drawn between the electrodes of the stacked assembly by capillary action. In another approach, the stacked assembly may be evacuated then totally immersed in the molten ionic conductor, optionally with an applied external pressure to aid capillary action in infiltrating the electrolyte into the porous structure. The stacked assembly is thereafter cooled in a controlled fashion to produce a laminate structure having electrical contact plates on the ends.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
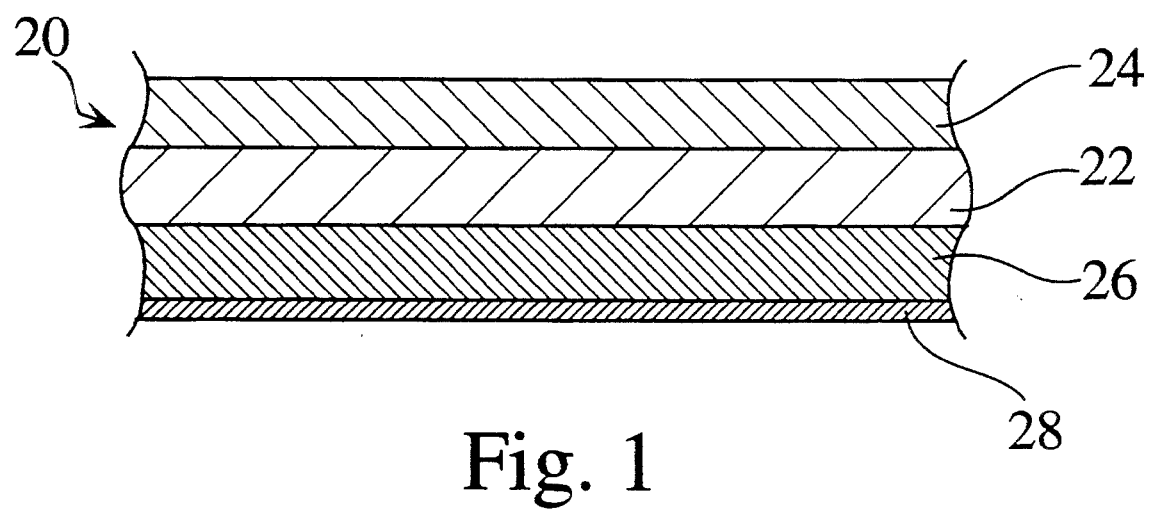
FIG. 1 shows a cross-sectional view of a single bipolar electrode.

Referring now to FIG. 1, a bipolar electrode 20 is shown. An electrode substrate 22 serves as a support for an anode 24 and a cathode 26. The electrode substrate 22 also serves as an electrical connection between the anode 24 and the cathode 26 by allowing the flow of electrons while blocking ionic conduction between the anode 24 and the cathode 26. A separator layer 28 overlays the cathode 26 and prevents direct physical contact between the anode and the cathode of adjacent electrodes in a stacked electrode assembly.

In an electrochemical capacitor of the invention, a stack of the bipolar electrodes is infiltrated with an electrolyte material to form a laminate structure as described below. Each electrode will form part of two adjacent cells of an electrochemical capacitor. In this context, a bipolar electrode is defined as a flat electrode with each of the two opposing surfaces having the capacity for energy storage through the double layer effect and/or oxidation-reduction (redox) reactions. For some applications, the same material may be used for the anode and cathode layers, while in other applications different materials may be used.

Further, for the purposes of illustration, the separator layer 28 has been shown as being applied to the cathode 26. However, the separator layer 28 can alternatively be applied to the anode 24. It is also possible to apply a thinner separator layer to each of the anode 24 and cathode 26 as long as sufficient electrical separation is provided between adjacent layers in a stacked electrode assembly.

While it is desirable that the substrate 22 be as thin as possible, a limiting factor is the occurrence of pinholes in the substrate 22. It is also desirable that the substrate 22 be made of a material that has limited ductility after the bipolar electrodes have been assembled into a laminate structure, which structure is described subsequently. This lack of ductility is required to prevent burring or local distortion of the substrate during subsequent cutting of the laminate structure into individual capacitors. The limited ductility of the substrate 22 can be achieved by various means.

With capacitors produced in accordance with the method of the invention, the anode 24 and the cathode 26 comprise only a fraction of the device volume. Minimizing the thickness of the substrate 22 increases the energy density of the device and also reduces, to a small extent, the equivalent series resistance of the device. Thus, it is desirable to use metals that can be provided in a thickness of less than about 60 micrometers.

The preferred materials for the substrate 22 is a metal foil that is chemically inert with respect to the electrolyte and is capable of forming a bond with the anode 24 and the cathode 26. It is also desirable that the foil be capable of being etched to provide a rough surface in order to enhance bonding of the anode 24 and the cathode 26 to the substrate 22 and also to reduce the interfacial resistance between the anode 24 and the substrate 22, and between the cathode 26 and the substrate 22. The presently most preferred material for the electrode substrate is a thin foil of electroless nickel. The anode 24 and the cathode 26 are porous, electronically conductive coatings on the substrate 22. (In this context, an electronically conductive material, which conducts charge by the movement of electrons, is to be distinguished from an ionically conductive material, which conducts charge by the movement of ions.) Preferred materials for the anode and cathode coatings are platinum-group metals. Of these possible anode and cathode coating materials, porous platinum is the most preferred and will serve as the basis for the following discussion.

Figure 2:
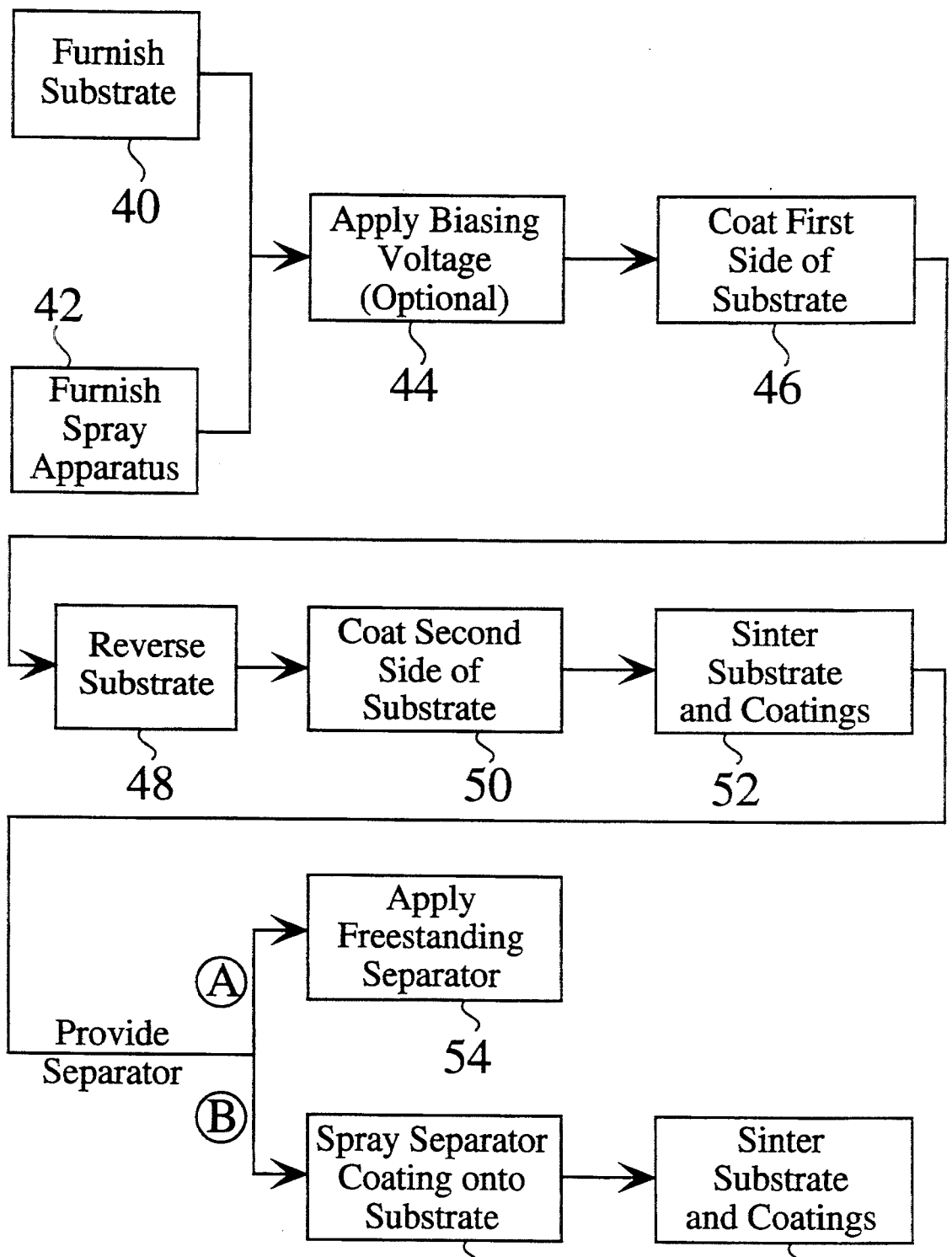
FIG. 2 depicts a process for preparing an electrode structure.
Figure 3:
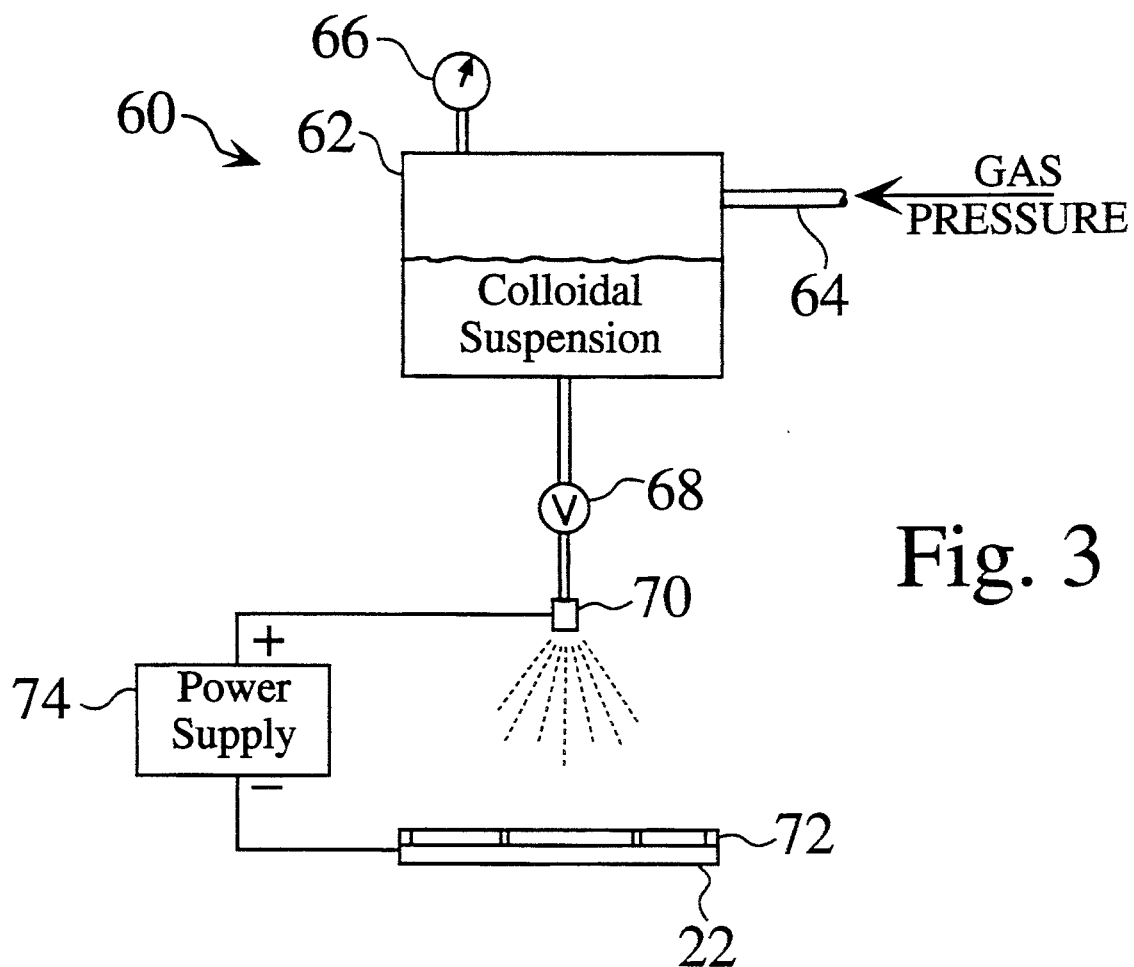
FIG. 3 shows a schematic elevational view of a spray apparatus used in preparing the electrode structure.
Figure 4:
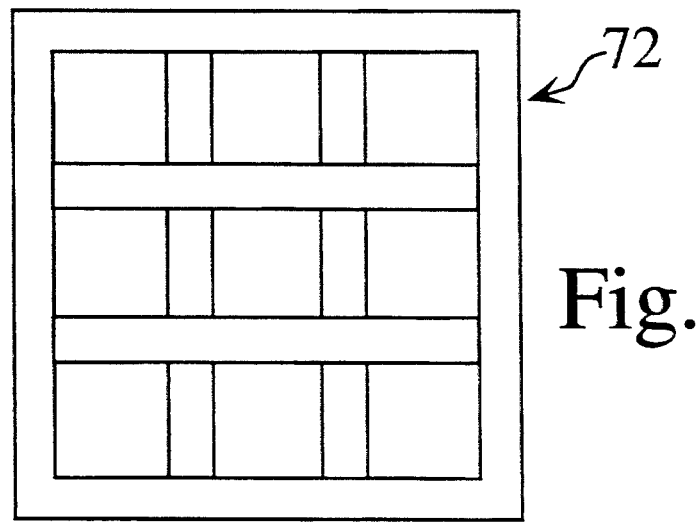
FIG. 4 shows a plan view of a mask used in the spray apparatus of FIG. 3.

A process for producing bipolar electrodes by application of the anode 24 and the cathode 26 to the substrate 22 is depicted in FIG. 2, and the apparatus is shown in FIGS. 3 and 4. An aerosol spray process is the preferred technique for obtaining the porous platinum coating. The aerosol spray process is widely known for use in other applications for preparing coatings on substrates.

In general, the non-oxide material to be deposited as a porous coating, here platinum, is provided in the form of a colloidal suspension of finely divided platinum particles. The colloidal suspension is sprayed onto the substrate. The liquid component of the suspension acts as a temporary under that causes the particles to weakly adhere to the substrate and to each other, after deposition is complete. Additionally, an electrostatic potential may be applied between the aerosol source and the substrate, to cause particles charged by the source to be attracted to and adhere to the substrate. After a desired thickness of the coating is deposited, the coating and substrate are heated to permanently sinter the particles into an adherent, porous coating. The details of the aerosol spray process as applied to the preferred deposition of a porous platinum coating will be described subsequently.

Referring to FIG. 2, the substrate 22, preferably an electroless nickel foil, is supplied, numeral 40. A spray apparatus 60, shown in greater detail in FIGS. 3-4, is provided, numeral 42.

Referring to FIG. 3, the spray apparatus 60 includes a reservoir 62 containing a liquid colloidal suspension of platinum particles. The colloidal suspension of platinum and other platinum-group metals can be prepared by reduction of the metal salts in aqueous solutions. Monodisperse suspensions can be obtained by preparing emulsions of the aqueous salt solutions with the proper organic solvents and surfactants. Upon completion of the reduction reaction, the suspension composition can be optimized for the spray coating operation. The production of platinum, palladium, rhodium and iridium colloidal suspensions through a microemulsion technique is disclosed in M. Boutonnet, et al. "The Preparation of Monodisperse Colloidal Metal Particles From Microemulsions" *Colloids and Surfaces,* 5(1982) pp. 209–225, Elsevier Scientific Publishing Company.

A gas pressure is applied to the surface of the colloidal suspension from a gas pressure line 64, and the magnitude of the pressure is measured by a pressure gage 66. A flow of the colloidal suspension passes through an adjustable regulating valve 68 to a spray head 70 of any operable type. An aerosol spray passes from the spray head 70 to deposit onto the substrate 22. A pattern of the deposited material on the substrate 22 may be defined with a mask 72, shown in FIG. 4.

The liquid component of the aerosol spray aids in adhering the platinum particles contained in the colloidal suspension to the surface of the substrate 22. An electrical potential may optionally be applied by a power supply 74 between the spray head 70 and the substrate 22, numeral 44. The potential is thereby applied between the particles and the substrate 22 to aid in the adherence of the particles to the substrate. Electrostatic spraying of powders is well known in the art.

Returning to FIG. 2, the first side of the substrate 22 is coated, numeral 46, typically with a thickness of about 1 micrometer of the particulate material. At this point, the coating of particulate on the first side of the substrate could be sintered. A preferred approach is to reverse the substrate 22 to expose a second side to the spray, numeral 48, and to coat the second side of the substrate, numeral 50, with the electrode material. One of the coatings becomes the anode 24 and the other coating becomes the cathode 26.

The coating material used to form the anode 24 is not necessarily the same as that used to form the cathode 26, since the redox reactions at the cathode 26 may differ from those at the anode 24. For some applications the anode 24 and the cathode 26 are identical, resulting in what is essentially a non-polar device. In other applications, the anode 24 and the cathode 26 are different, and the device is polar.

The substrate and coatings are heated to an appropriate temperature and allowed sufficient time to sinter the coatings, numeral 52. The sintering causes the particles to adhere to each other and to the substrate 22. The objective of the sintering process is to cause the particles to bond to each other and to the substrate, but not to densify the coating so as to lose the majority of the as-deposited porosity. The sintering temperature and time depend upon the material of the electrodes, the desired volume fraction of porosity in the coating, and the sintering atmosphere. For the case of the preferred platinum, the sintering treatment is about 1–4 hours at a temperature of about 400°–800° C.

When a non-oxide porous layer is applied, it is important to avoid the production or presence of an oxide coating on the substrate 22. To achieve this result, it is desirable to conduct the sintering operation in a reducing atmosphere such as hydrogen gas or a mixture of hydrogen and inert gas. The reducing atmosphere prevents the formation of oxide on the surface, and tends to reduce any oxide already on the surface of the substrate 22. The preferred atmosphere is wet hydrogen.

The non-oxide porous coating is preferably a platinum-group metal, and most preferably platinum spray deposited as just described. The as-deposited electrode material has a high surface area due to the high degree of porosity in the spray-deposited and sintered state.

After the anode 24 and cathode 26 coatings are sintered to essentially their final form, the separator layer 28 is provided. The separator layer can be provided in various ways. In one approach, path A of FIG. 2, the separator layer 28 is prepared as a freestanding, porous piece of material and placed into contact with either the anode 24 or the cathode 26, numeral 54. The separator layer 28 may be, for example, a freestanding mesh or a freestanding felt. Any suitable electrically non-conducting, porous material that is wetted by the electrolyte can be used. In one approach, a mesh of glass fibers such as 0.002 inch thick glass paper is suitable. The use of a freestanding separator layer 28 requires that the separator layer 28 be self-sustaining and self-supporting. The separator layer made by this approach must therefore be relatively thick.

In another approach, path B of FIG. 2, the separator layer 28 is applied by an aerosol spray process directly to either the anode 24 or the cathode 26. The separator layer 28 produced by such an approach may be made thinner than the freestanding separator layer. To apply a separator layer by the second approach, the spray apparatus 60 is used, but a colloidal suspension of silicone dioxide ($SiO_2$) is sprayed onto the selected side, numeral 56, using the mask 72. After a desired thickness of separator layer material is deposited, typically about 1-10 micrometers, the separator layer, the previously deposited layers, and the substrate are sintered, numeral 58. The sintering temperature and time depend upon the material of the separator layer, but the sintering temperature is typically about 200°-400° C. and the sintering time is typically about ½-4 hours.

As stated above, the function of the separator layer 28 is to prevent direct physical contact between the anode 24 and the cathode 26 of adjacent electrodes 20.

It is also desirable that the separator coating have a high percentage of porosity so that it can be infiltrated with a molten electrolyte. Since the electrolyte electrical conductivity is about two orders of magnitude less than that of the electrodes, it is desirable to keep the separator layer 28 as thin as possible and to maintain a high porosity in the coating. Although the application of very thin porous coatings is not difficult, it must be realized that as a practical matter, the electrodes are neither ideally smooth nor ideally flat. If dust particles are incorporated into the coating, the smooth surface will be degraded. For this reason, it is very desirable that the coating process be done in a clean environment and that the coating solutions be prepared from filtered materials. The thickness of the separator coating 28 must be greater than the height of any protrusions in the cathode 26 and the anode 24 surfaces if shorting is to be prevented. Contact shorts through the separator coating will increase the leakage current in the cell. Smooth anode and cathode surfaces will allow for a thin separator layer 28, which will in turn give a lower equivalent series resistance. It is thus desirable to produce electrode coatings 24 and 26 of about 10 micrometers in thickness and separator layers of about 10 micrometers or less in thickness.

The process of FIG. 2 may be implemented as either a batch or a continuous process.

Figure 5:
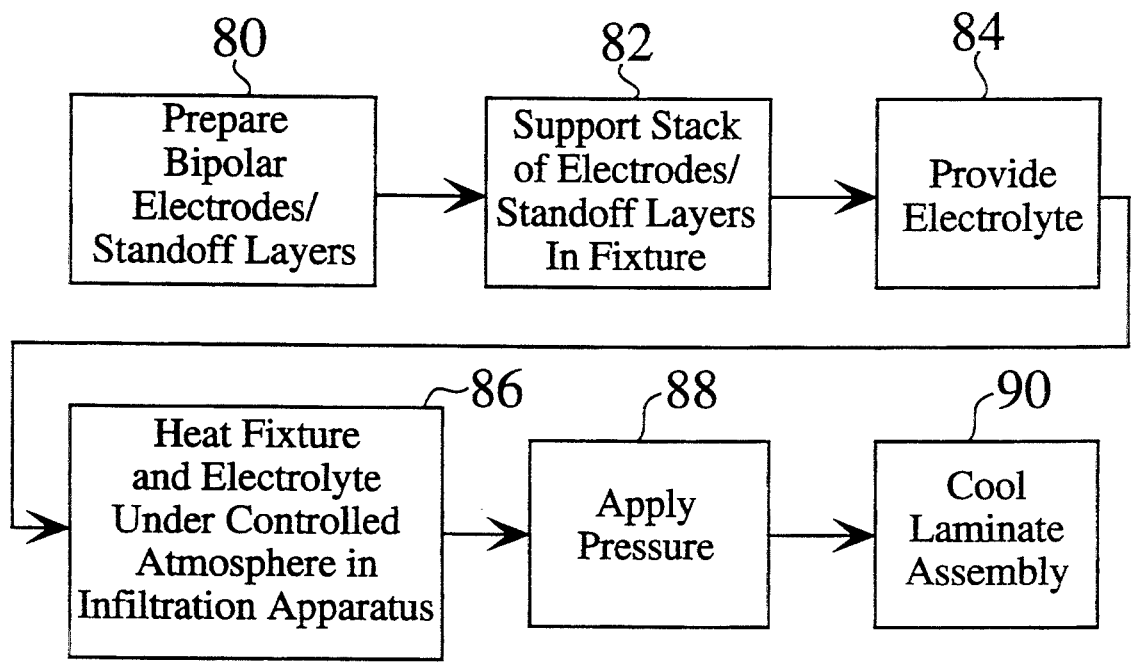
FIG. 5 shows the steps of a first process for preparing a capacitor.
Figure 6:
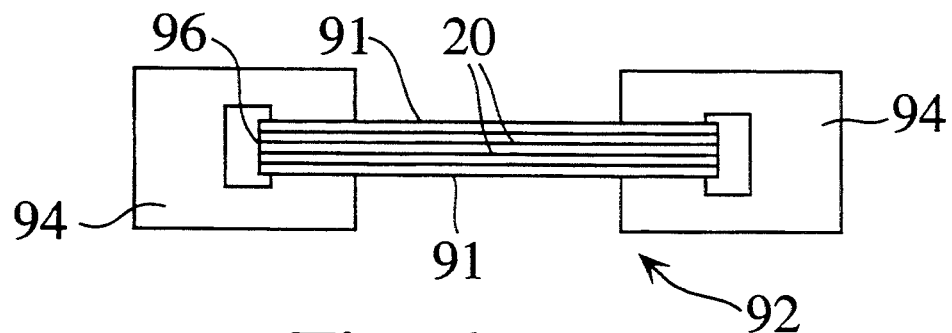
FIG. 6 shows an elevational view of a stack fixture used in the process of FIG. 5.
Figure 7:
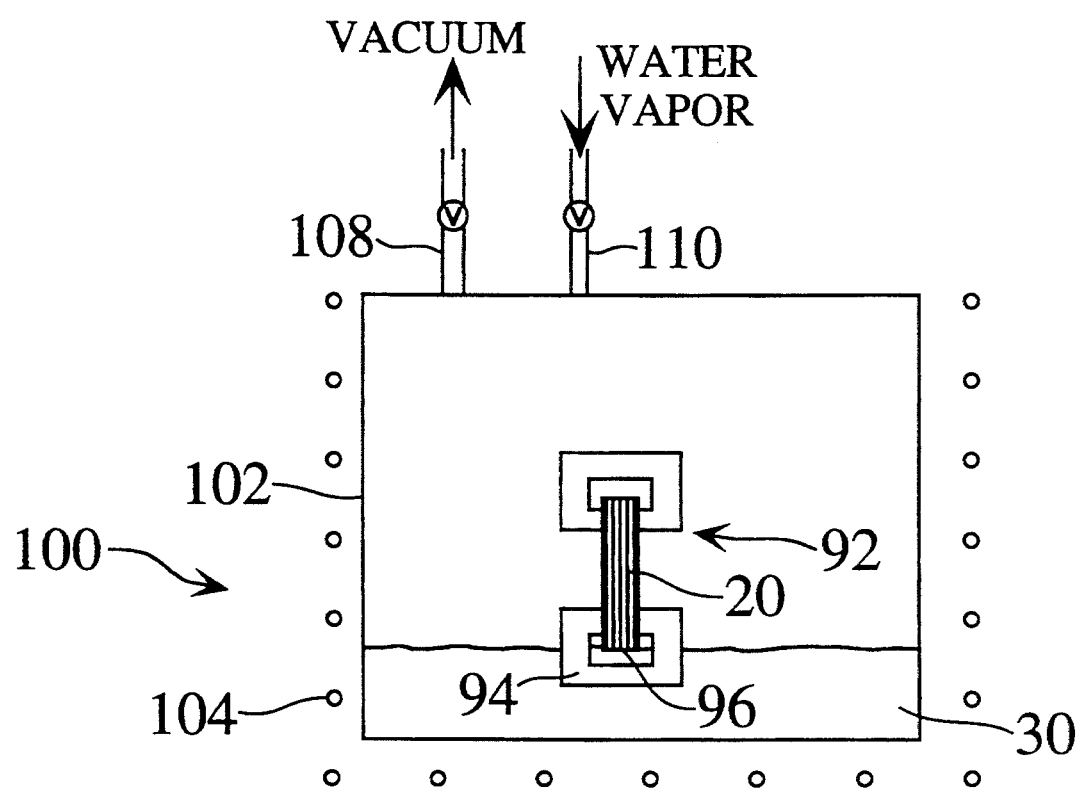
FIG. 7 shows a first infiltration apparatus used in the process of FIG. 5.
Figure 8:
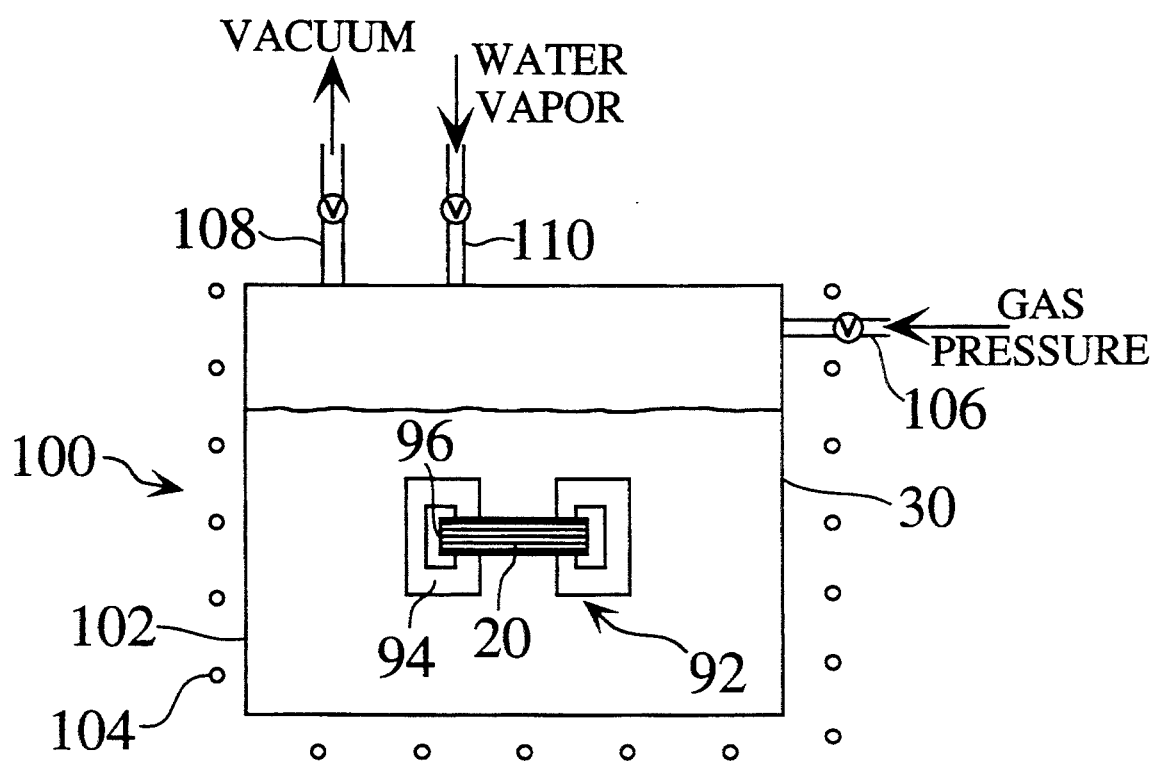
FIG. 8 shows a second infiltration apparatus used in the process of FIG. 5.

FIG. 5 depicts a process for preparing a capacitor using the electrode structures prepared by the prior approach, and FIGS. 6-8 illustrate fixturing and infiltration apparatus used in the process.

Referring to FIG. 5, the individual bipolar electrode structures 20 (each including the substrate 22 with deposited anode 24 and cathode 26, and separator 28) are first prepared, numeral 80, according to the techniques discussed previously. At least two, and typically a large plurality of, the bipolar electrode structures 20 are stacked together with appropriate fixturing, numeral 82. When the stack is assembled, the outermost element on each end may be a contact plate 91. External leads are welded or soldered, or otherwise joined, to the contact plate after the capacitor is fabricated and it is connected into an electronic circuit.

FIG. 6 shows one type of fixture 92 that can be used. C-shaped clamps 94 are used to hold the sides of the electrodes 20 together. The connecting legs of the clamps 94 are spaced apart from the edges 96 of the stack of electrodes 20, so that the edges 96 of the stack are exposed to permit subsequent external infiltration.

An electrolyte is provided, numeral 84. The electrolyte is preferably a polyoxometalate ionic conductor, but may also be a halide solid or other operable electrolyte. The term "polyoxometalate ionic conductor" is synonymous with the term "heteropoly acid", where the former term includes both the acid and salt forms. The electrolyte is a solid at ambient temperature, and melts at a temperature above about 30° C., to permit the infiltration processing (to be disclosed subsequently.) In the molten state, the electrolyte must wet both the porous anode 24 and the porous cathode 26, as well as the separator layer 28, so as to provide a continuous electrolyte conductive path in the final capacitor. Polyoxometalate ionic conductors have been known previously for use in other contexts, but have not been used as the electrolyte for a capacitor. See, for example, U.S. Pat. No. 4,024,036 and B. Tell et al., "Electrochromic effects in solid phosphotungstic acid and phosphomolybdic acid", *J. Appl. Phys.*, Vol. 50, no. 9, pages 5944-5946 (1979), whose disclosures are incorporated by reference. Preferred polyoxometalate ion conductors for use in the present invention include molybdophosphoric acid, having a melting point of about 78°-90° C. (depending upon the state of hydration), and its salts, and tungstophosphoric acid, having a melting point of about 78°-90° C. (depending upon the state of hydration), and its salts.

An infiltration apparatus 100 is provided and used to infiltrate electrolyte into the stack of electrodes 20, numeral 86. FIG. 7 shows one form of the apparatus 100 in which the free end 96 of the stack is contacted to the surface of the molten electrolyte 30, and FIG. 8 shows another form of the apparatus 100 in which the entire electrode stack is immersed below the surface of the molten electrolyte. In each case, the apparatus 100 includes a container 102 and a heater, here shown as a heating resistance coil 104. A quantity of the selected electrolyte material 30 is placed into the container 102. The heater is operated to heat the container to a temperature above the melting point of the electrolyte. In an alternative embodiment, molten electrolyte could be introduced to the container from an external source.

After heating to an infiltration temperature above the melting point of the solid electrolyte, the fixture 92 and its retained stack of electrodes 20 is contacted to the molten electrolyte. In the apparatus of FIG. 7, a free end of the stack is contacted to the surface of the molten electrolyte so that electrolyte is drawn into the porous material by capillary action. In the apparatus of FIG. 8, the container is evacuated prior to melting the electrolyte and then the entire stack is immersed, so that the edges 96 of the stack are below the surface of the electrolyte. The evacuation is necessary to remove any gas from the stack. Electrolyte is drawn into the interior of the stack by capillary action. This externally infiltrated electrolyte material flows into the porosity in the electrodes 24 and 26, and into the porosity of the separator layer 28.

In the event that the capillary action is by itself insufficient to accomplish the infiltration of the electrolyte into the stack of electrodes 20 in the apparatus of FIG. 8, an external overpressure may optionally be applied to the surface of the molten electrolyte through a pressure line 106, numeral 88, following immersion of the stack to cause the molten electrolyte to flow and infiltrate into the anode, cathode, and separator. The overpressure aids the capillary action in achieving the external infiltration. (Such an overpressure is not used in conjunction with the approach of FIG. 7.)

The infiltration is accomplished in a controlled atmosphere whose character is determined by the nature of the electrolyte. For halide solids such as $RbAg_4I_5$ or $Rb_4Cu_{16}I_7Cl_{13}$, it is desirable to reduce the amount of moisture and oxygen present while the electrolyte is in the molten state, as such electrolytes are susceptible to oxidation. This can be achieved by heating the stack at a temperature of at least about 100° C. under a vacuum of less than about $10^{-2}$ torr for a period of at least about 15 minutes by connection to a vacuum source through a vacuum line 108. The time, temperature, and vacuum required will be a function of the electrode material and its history. Due to the high available surface area of the bipolar electrodes 20, it is desirable that devices with moisture sensitive electrolytes be stored in a controlled environment. Although adsorbed moisture can be desorbed, it is desirable to minimize the quantity that must be desorbed from a stacked assembly since the path available to desorbing species is restricted. Vacuum outgassing of the separated electrodes followed by dry storage of the electrodes is more efficient than removing moisture from the stack.

Where the solid electrolyte is a polyoxometalate ionic conductor, such as molybdophosphoric acid or tungstophosphoric acid, it is important to maintain the proper partial pressure of water during the infiltration process in order to maintain the hydration state associated with the maximum protonic conductivity. Although evacuation of the assembly that is to be infiltrated with a polyoxometalate ionic conductor is required to remove the gas from electrode assemblies, a source of water vapor such as a water vapor port 110 must be provided to maintain hydration. Under these conditions the vacuum system must be capable of handling a large amount of water vapor.

After infiltration is complete, the assembly is cooled, numeral 90. The incongruent melting behavior of many of the halide solid electrolytes require that the molten electrolyte be rapidly cooled or quenched to avoid phase segregation. After infiltration, the rapidly solidified electrolyte is aged to produce the equilibrium structure. Since the cooling of an incongruently melting material involves the reaction of a liquid and solid to produce another distinct solid, it is desired that the liquid and solid be finely mixed at the time of freezing. If the molten electrolyte is allowed to cool slowly and segregate into the equilibrium liquid and solid, it will be more difficult to achieve an equilibrium structure in the fully solidified material. Quenching followed by thermal aging is the preferred method for achieving the equilibrium structure. In the case of $Rb_4Cu_{16}I_7Cl_{13}$, complete melting is achieved at above 300° C. and solidification occurs in the neighborhood of 234° C. It is thus desirable that the assembly be cooled very quickly through the range of about 300° C. to 234° C. Rapid cooling can be achieved by discontinuing the heat input and providing a flow of a coolant gas through water vapor line 110.

When the electrolyte solidifies, its volume decreases. Ordinarily, voids in the electrolyte could result, but the preferred manner of achieving the accelerated cooling discourages the formation of voids within the electrolyte. Accelerated cooling is preferably accomplished in a center-to-edge directional manner. This directional solidification can be achieved by directing a jet of cooling gas against the centers of the faces of the contact plates 91 at each end of the stack. The gas jet preferentially cools the portion furthest from the free ends 96. Solidification of the electrolyte therefore occurs so that the electrolyte near the center solidifies first and the electrolyte near the free ends 96 solidifies last. As the electrolyte near the center solidifies with a tendency to form voids, electrolyte from the still-molten edge regions can flow toward the center to fill any incipient voids. The progression of inward flow continues as the electrolyte solidifies, until at the very edges some recesses may occur because there is no more electrolyte to flow inwardly. The stack is typically made laterally oversize prior to this stage, so that the defective edge material may be cut away and discarded.

The solidification behavior of the polyoxometalate ionic conductors does not require rapid cooling. However, a stack having such an electrolyte should be cooled at a reasonable rate to avoid changes in the state of hydration. Since the partial pressure of water vapor provided in the chamber is that required to maintain hydration in the solid phase, the liquid phase may undergo a change of hydration over time at the exposed edges of the stack. Although the hydration state of the polyoxometalate ionic conductor can be restored by re-hydration, it is preferable to avoid the need to do so.

Figure 9:
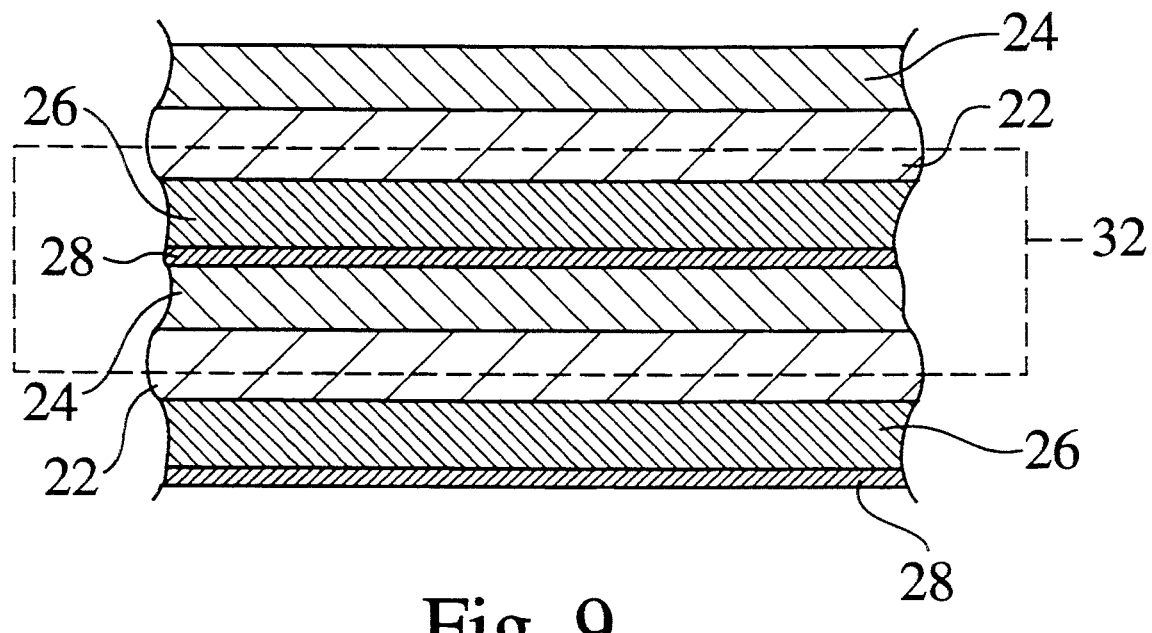
FIG. 9 shows a cross-sectional view of a portion of a solid electrolyte capacitor showing one complete cell.

The solidification of the electrolyte produces a laminate structure in which the individual bipolar electrodes are bonded together by the electrolyte that has infiltrated the porous surfaces of the electrodes. A complete capacitor cell 32 is shown in FIG. 9, bonded into the stack of other capacitor cells on either side and therefore electrically in series with the capacitor cell 32. Each capacitor cell 32 includes an anode 24 and a cathode 26, separated by a separator 28. A portion of the substrate 22 is also present in the capacitor cell 32. The electrolyte material is infiltrated into the porosity of the anode 24, the cathode 26, and the separator 28, and is not separately visible.

After the laminate fabrication, the capacitor is completed by cutting the stack to the desired overall cross sectional shape and size, removing rough edges and burrs, adding electrical contacts to the outermost anode and cathode, and placing the capacitor into a hermetic package so that its performance is not degraded by environmental effects.

The preferred method for cutting the laminate is a diamond saw lubricated with a fluid that is inert with respect to the electrolyte. It is preferred that the cutting process produces a surface finish on each capacitor that is free from burrs and distortion of the substrate. Since the spacing between substrates may be only a few micrometers, it is critical that burrs and edge deformation be minimized in order to minimize additional polishing steps prior to packaging. The cutting operation allows for the removal of the exterior portions of the laminate that may have been degraded due to atmospheric reaction or solidification defects. The sawed edge will typically have a better finish than the starting substrate since it is fully supported by solid material on both sides during the cutting operation. The sawn surface may be grit blasted or otherwise abraded to preferentially remove electrolyte from the space between electrodes prior to encapsulation. The recessed electrolyte gap serves to increase the potential short circuit path length between the anode and the cathode. The recess also provides a mechanical interlock for encapsulants such as epoxy resins.

The laminate structure produced by the present approach allows considerable freedom in determining the final capacitance value of a device. Since the capacitance of a device cut from the laminate structure will be a function of area, close tolerances can be achieved for devices by cutting an initial test device from the laminate structure and measuring its electrical properties. The required area for subsequent devices can thus be accurately determined and the devices cut accordingly.

Another important advantage of the laminate structure over that of the conventional pressed powder electrodes is the strength provided by the composite structure. Any relatively brittle portions of the structure are effectively reinforced by the metal foil substrates. This allows for easier handling of larger and thinner structures.

It should be understood that various alternatives to the embodiments of the invention described herein may be employed in practicing the invention. It is intended that the following claims define the scope of the invention and that structures and methods within the scope of these claims and their equivalents be covered thereby.

What is claimed:

1. A method for making an electrochemical capacitor, comprising the step of:
   assembling a stacked assembly of at least two bipolar electrodes, each of the bipolar electrodes comprising a metal foil electrode substrate having a porous, electronically conductive, substrate coating on each surface, the stacked assembly further including a porous separator layer between each of the electrodes, the separator layer being made of a material that is electronically non-conductive;
   providing an ionic conductor electrolyte that wets both the substrate coating and the separator layer at temperatures above the melting point of the solid ionic conductor electrolyte, the ionic conductor electrolyte having a melting point above about 30° C.; and
   introducing the ionic conductor electrolyte into the stacked assembly.

2. The method of claim 1, wherein the step of assembling a stacked assembly includes the step of furnishing an electrode having a porous metallic coating on each surface.

3. The method of claim 2, wherein the step of furnishing an electrode includes the steps of:
   providing a sheet of metal; and
   spray coating a porous metallic coating on each surface of the sheet of metal.

4. The method of claim 3, wherein the step of spray coating includes the steps of:
   furnishing a colloidal suspension of the coating metal used in the porous metal coating;
   forming an aerosol spray containing the coating metal; and
   depositing the coating metal upon the sheet from the aerosol spray.

5. The method of claim 1, wherein the step of assembling a stacked assembly includes the step of forming the coating from a platinum-group metal.

6. The method of claim 1, wherein the step of providing an ionic conductor electrolyte includes the step of providing a polyoxometalate ionic conductor.

7. The method of claim 1, wherein the step of providing an ionic conductor electrolyte includes the step of providing an electrolyte selected from the group consisting of molybdophosphoric acid and salts thereof, and tungstophosphoric acid and salts thereof.

8. The method of claim 1, wherein the step of assembling a stacked assembly includes the step of providing said porous separator layer made in a form selected from the group consisting of a freestanding mesh, a freestanding felt, and a porous coating applied to an electrode.

9. The method of claim 1, wherein the step of introducing includes the steps of:
   melting the solid ionic conductor electrolyte outside of the stacked assembly; and
   contacting the melted ionic conductor electrolyte to the edges of the stacked assembly.

10. The method of claim 9, including the additional steps of:
    evacuating the gas from a chamber containing the stacked assembly;
    immersing the stacked assembly in the melted electrolyte; and
    applying a pressure to the melted electrolyte to cause the electrolyte to flow between the electrodes of the stacked assembly.

11. A method for making an electrochemical capacitor, comprising the steps of:
    providing a stacked assembly of at least two bipolar electrodes, each of the bipolar electrodes comprising a metal foil electrode substrate having a porous, electronically conductive substrate coating on each surface, the coating being selected from the group consisting of the platinum-group metals, the stacked assembly further including a porous separator layer between each of the electrodes, the separator layer being made of a material that is electronically non-conductive;
    supporting the electrodes in a fixture;
    providing an ionic conductor electrolyte that wets both the substrate coating and the separator layer at temperatures above the melting point of the solid ionic conductor electrolyte, the ionic conductor electrolyte having a melting point above about 30° C.;
    melting the solid ionic conductor electrolyte;
    contacting the melted ionic conductor electrolyte to an edge of the stacked assembly to permit the molten ionic conductor to flow between the electrode of the stacked assembly; and cooling the stacked assembly in a controlled fashion to produce a laminate structure.

12. The method of claim 11, wherein the substrate coatings are made of platinum.

13. The method of claim 11, wherein the step of assembling a stacked assembly includes the steps of:
    providing a sheet of metal; and
    spray coating a porous metallic coating on each surface of the sheet of metal to form an electrode.

14. The method of claim 1, wherein the step of assembling a stacked assembly includes the steps of:
    providing a sheet of metal; and
    electrodepositing a porous metallic coating on each surface of the sheet to form an electrode.

15. The method of claim 11, wherein the step of providing an ionic conductor electrolyte includes the step of providing a polyoxometalate ionic conductor.

* * * * *

UNITED STATES PATENT AND TRADEMARK OFFICE
CERTIFICATE OF CORRECTION

PATENT NO. : 5,380,341
DATED : Jauary 10, 1995
INVENTOR(S) : M. Dean Matthews, et al.

It is certified that error appears in the above-indentified patent and that said Letters Patent is hereby corrected as shown below:

Column 12, claim 14, line 54, "method of claim 1" should be --"method of claim 11"--.

Signed and Sealed this

Tenth Day of October, 1995

*Attest:*

BRUCE LEHMAN

*Attesting Officer*  *Commissioner of Patents and Trademarks*